G. W. N. YOST.
Harvesters.
No. 137,815. Patented April 15, 1873.
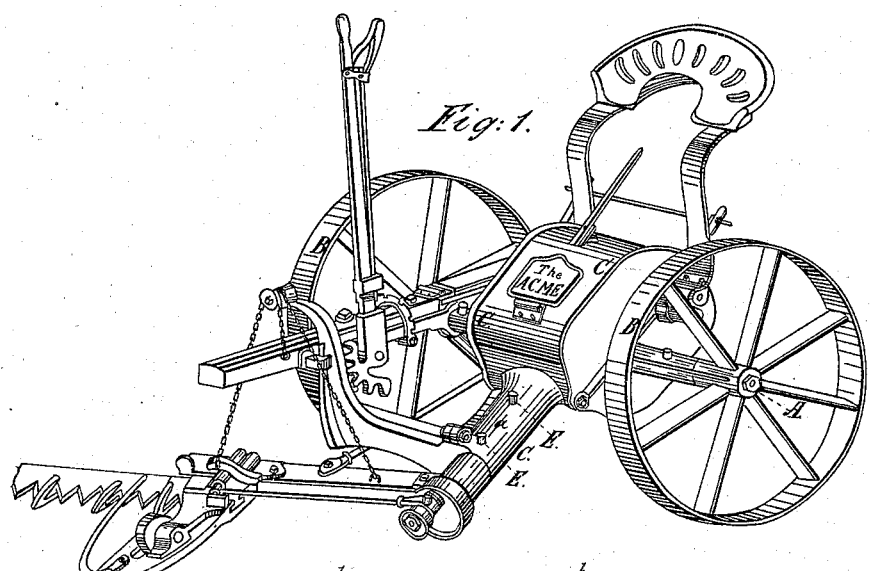
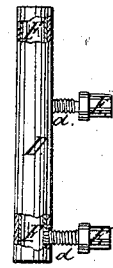
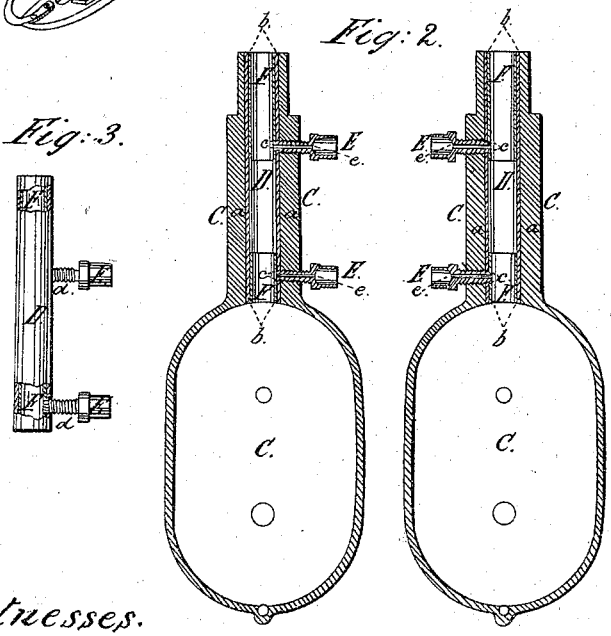
Witnesses.
John T. C. Preinkert
John A. Tauberschmidt
Inventor.
George W. N. Yost
By James Densmore
Agent.

UNITED STATES PATENT OFFICE.

GEORGE W. N. YOST, OF CORRY, PENNSYLVANIA, ASSIGNOR TO "ACME MOWER AND REAPER COMPANY," OF NEW YORK, N. Y.

IMPROVEMENT IN HARVESTERS.

Specification forming part of Letters Patent No. 137,815, dated April 15, 1873; application filed September 23, 1872.

*To all whom it may concern:*

Be it known that I, GEORGE W. N. YOST, of Corry, Pennsylvania, have invented an Improved Mowing and Reaping Machine, which I call the "Acme," of which the following is a specification:

The nature of that part of the invention included in this division, and to which the application for a patent therefor is confined, is an improved bush-holder, made by combining a bush-holding sleeve with an oiling-cup.

The accompanying drawing and the following description thereof fully illustrate the part of the invention included in this division.

Of the drawing, Figure 1 represents a view of my improved mowing-machine. Fig. 2 represents a sectional view, lengthwise, from the side through the middle of an inclosing-box main frame, with a bush-holder therein. Fig. 3 represents a side view of a bush-holding sleeve with bushes in the ends, and with oil-cups screwed in the top. Fig. 4 represents an end view of a bush-holding sleeve with a bush therein, and Fig. 5 represents a view of an oil-cup.

The following is the description: A represents a main axle of a mowing or reaping machine. B represents a driving-wheel on each end of the main axle A. C represents an inclosing-box main frame hinged on the main axle A between the driving-wheels B. $a$ represents a neck or one end of the main frame C. $b$ represents a hole, lengthwise, through the neck or end of the main frame C. D represents a long sleeve or tube loosely in the hole $b$ of the end of the main frame C, so that it can be put in and taken out with the fingers. $c$ represents recesses or steps in the upper side of the bush-holding sleeve D. E represents an oil-cup in the top of the neck or end $a$ of the main frame C, and extended down through and into the recesses $c$ of the sleeve D. $d$ represents a screw-stem of the oil-cup E, which is screwed into a screw-hole in the end $a$ of the main frame C, by which the cup is held tightly within the main frame. $e$ represents a small hole from the chamber or bowl of the oil-cup E, down through the stem $d$ of the cup, meeting a corresponding hole opening into the tube of the sleeve D, through which oil can flow from the oil-cup onto an axle within the sleeve. F represents a journal-bearing bush in each end of the bush-holding sleeve D.

The sleeve D, being loosely within the hole $b$ of the main frame C, can be taken out and put back easily when the crank-wheel is removed to repair or replace a journal-bush, F, and when within the frame the sleeve is held firmly, both from turning in a revolving direction and from moving endwise, by the stem $d$ of the oil-cup E set within the step $c$ of the sleeve. The oil-cup serves to convey oil to the journal of the crank-wheel axle within the bushes of the sleeve, and also serves to hold the sleeve from moving either endwise or on its axis.

The following is a summary of that part of the invention included in this division:

I claim—

The combination of an oil-cup with the main frame and the journal-bearing sleeve of mowing or reaping machine, substantially as and for the purpose described.

G. W. N. YOST.

Witnesses:
CHAS. BIRD,
JAMES DENSMORE.